United States Patent [19]

Purvis II et al.

[11] Patent Number: 5,733,961

[45] Date of Patent: Mar. 31, 1998

[54] IMPROVING THE SPRAYABILITY OF POLYCHLOROPRENE CONTACT BY SHEARING IN MICROFLUIDIZER

[75] Inventors: Daniel C. Purvis II; John J. Ach; John P. Jones, all of Temple, Tex.

[73] Assignee: Premark RWP Holdings, INC., Wilmington, Del.

[21] Appl. No.: 664,725

[22] Filed: Jun. 17, 1996

[51] Int. Cl.$^6$ ............... C08K 03/22; C08K 05/01; C08L 11/02

[52] U.S. Cl. ............... 524/433; 524/475; 524/556; 524/557

[58] Field of Search ............... 524/433, 556, 524/567, 475

[56] References Cited

U.S. PATENT DOCUMENTS

| | | | |
|---|---|---|---|
| 3,361,693 | 1/1968 | Geschwind. | |
| 3,595,821 | 7/1971 | Spector et al. | 525/139 |
| 3,965,061 | 6/1976 | Bash et al. | 524/271 |
| 4,401,271 | 8/1983 | Hansen | 239/337 |
| 4,533,254 | 8/1985 | Cook et al. | 366/176 |
| 4,783,389 | 11/1988 | Trout et al. | 430/137 |
| 5,066,522 | 11/1991 | Cole et al. | 427/422 |
| 5,444,112 | 8/1995 | Carnahan | 524/272 |

FOREIGN PATENT DOCUMENTS 2002620 of 1969 France.

OTHER PUBLICATIONS

Chemical Abstract, Japanese patent no. 5–295336, 1993.
Microfluidics technical bulletin, "M–210–EH Pilot Plant Production Microfluidizer", 4 pages.
WPIDS accession no.82–1169E for German patent no. 3028693, Beiersdorf AG Feb. 1982.
WPIDS accession no. 93–392937 for Japanese patent no. 5–295336, Sekisui Chem Ind Co Ltd Nov.1993.

*Primary Examiner*—Robert E. Sellers
*Attorney, Agent, or Firm*—Oblon, Spivak, McClelland, Maier, Neustadt, P.C.

[57] ABSTRACT

Polychloroprene contact adhesive is made by mixing polychloroprene, tackifier, metallic oxide, antioxidants and organic solvent. The contact adhesive is sheared for reducing its ASTM D 1084 Saybolt viscosity by 10 percent or more. Shearing improves the sprayability of the polychloroprene contact adhesive. It makes it more uniform and reduces its viscosity.

6 Claims, No Drawings

IMPROVING THE SPRAYABILITY OF POLYCHLOROPRENE CONTACT BY SHEARING IN MICROFLUIDIZER

BACKGROUND OF THE INVENTION

1. Field of the Invention

This invention relates to shearing polychloroprene contact adhesives for improving their sprayability. This invention particularly relates to making polychloroprene contact adhesives sprayable from aerosol containers.

2. Description of the Related Art

Polychloroprene contact adhesive, when coated on two materials adheres to itself upon contact, after drying. Polychloroprene contact adhesives have been formulated in both solvent and water-based systems. The materials joined together can be the same or different and include wood, plastic laminates, paper, various materals such as glass, carbon fiber, concrete, ceramics, and metals such as iron, steel, and aluminum.

The choice of the particular type of polychloroprene will depend on the properties (e.g. flammability, oil resistance, toughness, extensibility, crystallization rate, resistance to crystallization, etc.) required in the contemplated end use.

Polychloroprene contact adhesives are commercially formulated with tackifiers, metallic oxide and antioxidants. Additionally, the use of copolymers of chloroprene, 2-chloro-1,3-butadiene, and alkylacrylates or methacrylates along with homopolymers of chloroprene have been found to impart high temperature bonding characteristics to polychloroprene contact adhesives. The relative amounts of the particular components employed will vary over a wide range depending upon the specific components as well as the desired end use.

Commercially available tackifiers for polychloroprene contact adhesives include natural and modified rosins, polyterpene resins, phenolic resins, phenolic modified terpene resins, and aliphatic petroleum hydrocarbon resins.

Metallic oxide, such as magnesium and zinc oxide, serves as acid acceptors by neutralizing the hydrochloric acid which is released upon the aging of polychloroprene, thereby minimize the deterioration of materials that come into contact with the polychloroprene contact adhesives. They serve, furthermore, as curing agents for the polychloroprene, thereby increasing the tensile strength of the resulting adhesive bonds, and also aid in the room temperature crosslinking.

The antioxidant prevents embrittlement and discoloration. The following antioxidants have been disclosed as suitable for use in formulating polychloroprene contact adhesives: phenyl-alpha-naphthylamine, phenyl-beta-naphthylamine, phenyl-beta-naphthalene, and 2,2,'-methylene-bis (4-methyl-6-tertiary butyl-phenol).

Small volume applications of polychloroprene contact adhesives are conveniently applied by aerosol spraying. An aerosol sprayhead nozzle structure is disclosed which enables the formulation of aerosol adhesives based on soluble polychloroprene that, in turn, produced approximately two and one-half times the area coverage as compared to the best commercially available aerosol fan sprayhead. The sprayhead permitted an aerosol solids level as high as 11.1 percent, which would provide enough adhesive in a 16 fluid ounce (480 cubic centimeters) container to cover two surfaces of an area of 99.3 square feet (9.23 square meters), while the best commercially available aerosol fan sprayhead was able to produce an acceptable fan spray pattern at levels no higher than 4.4 percent aerosol solids using the same adhesive formulation, which would provide an amount of adhesive in the same size container sufficient to cover two surfaces of an area of only about 39.4 square feet (3.66 square meters). (U.S. Pat. No. 4,401,272)

The improved nozzle structure permits adhesives in solution to be sprayed in an acceptable pattern at typical aerosol container pressures of between approximately 20 psi (0.14 megapascals) and 100 psi (0.69 megapascals), as opposed to the approximately 2,000 psi (13.8 megapascals) necessary when such solutions of polychloroprene contact adhesives are sprayed using airless spray gun equipment. It is thought that this ability to spray at low pressures and the dramatic difference in pressures is at least partially attributable to the fact that in aerosol applications the propellant is in solution and a portion of the propellant is sprayed along with the adhesive solution.

The spray pattern produced by this disclosed spray head has not been completely uniform in that areas of light coverage and sharply defined, stringy margins are produced, and the spray nozzle cannot adequately cope with normal milling variations of the rubber and variations in the solids content of the adhesive solution.

It is disclosed that a restriction in the flow path of polychloroprene adhesive upstream of the spray nozzle increases the uniformity of a fan-shaped spray pattern and the tolerance of the sprayhead for milling variations in polychloroprene. The restriction can be a single orifice or a plurality of orifices.

Spray patterns are disclosed for polychloroprene contact adhesive sprayed from an aerosol container with and without an orifice. Dimethyl ether is used as the propellant. The polychloroprene adhesive is 11.1 wt % solids. It is sprayed from above onto a horizontal from a container held at approximately 45 degrees with the nozzle opening approximately 6 inches (150 mm) from the surface. Spray pattern is distinguished by sharply defined and stringy margins on both ends, and areas of light coverage toward the ends. The spray pattern with the restriction is characterized as having an absence of stringy margins and much less severe areas of light coverage. A sample of the spray pattern was dried and cut into five equal sections, each comprising one-fifth of the pattern transverse to the direction of the sprayhead motion. Following is the amount of polychloroprene contact adhesive on each section expressed as the percentage of the total polychloroprene adhesive on the sample.

| Orifices | Adhesive on One-Fifth of Spray Pattern Width (% of Total) Away from Container --- Toward Container | | | | |
| --- | --- | --- | --- | --- | --- |
| None | 34.3 | 32.4 | 12.7 | 7.8 | 12.5 |
| One Orifice | 19.1 | 12.4 | 20.2 | 18.0 | 30.3 |
| Two Orifices | 11.0 | 11.0 | 15.1 | 39.7 | 23.3 |
| Three Orifices | 25.8 | 16.5 | 18.6 | 13.4 | 25.8 |

A sprayable adhesive composition based on nonionic neoprene latex is disclosed. Sprayability, including the capability for application by aerosol spraying, is imparted in the adhesive by providing a nonionic surfactant in the composition and by avoiding ingredients that would cause coalescence or thickening. The addition of a nonionic surfactant provides for an effective adhesive formulation without use of an alkali and enables preparation of the formulation using a modified "one-shot high-shear mix" technique, resulting in a sprayable composition with minimized water content. A nonionic surfactant is essential to providing a composition that may be applied by aerosol spraying without coagulating or clogging the spray equipment or canister. (U.S. Pat. No. 5,444,112)

The components are combined under agitation to form a dispersion that is then filtered to remove particles that could cause coagulation and clogging up of spray equipment or containers. The starting nonionic neoprene latex is first combined with a liquid surfactant, and the two are thoroughly mixed. The remaining ingredients including resin, zinc oxide, and antioxidant are then added to the dispersion in dry form under high shear as by being agitated in a Silverson mixer at a speed of 3,445 rpm. The dispersion is then subjected to filtration to remove any coagulated solids that might cause clogging.

Depending on the amount of adhesive being used for a particular type of application, the adhesive prepared as described above may be packaged in self-contained, pressurized aerosol cans or canisters or in drums equipped with a pressurized air system and a remote spray gun.

There is a need for a polychloroprene contact adhesive that can be sprayed from an aerosol container in a uniform spray pattern. There is also a need for a polychloroprene adhesive that can be formulated to have not less than 15 weight percent (wt %) solids. There is a further need for a polychloroprene contact adhesive that can be sprayed from an aerosol container with valves and nozzles that are commercially available.

SUMMARY OF THE INVENTION

It has now been discovered that polychloroprene contact adhesives can be sheared for making them sprayable from aerosol containers in uniform spray patterns. Shearing for reducing the Stormer ASTM D 1084 viscosity by at least 10% and preferably by at least 15% and most preferably by at least 20%, while holding the solids content constant, permits the formulation of polychloroprene contact adhesive to solids contents of 15 weight percent or greater. Polychloroprene contact adhesive can be sheared in accordance with this invention for spraying from aerosol containers through commercially available spray heads and nozzles. The spray pattern remains substantially uniform as all of the contents of the aerosol container is sprayed.

DETAILED DESCRIPTION OF THE INVENTION

Polychloroprene contact adhesive of the following formulation is used for illustrating the shearing of this invention. Samples 1–12 are portions of this formulation that have been subjected to shearing as shown on Tables 1 and 2. The spraying characteristics of Samples 1–12 from aerosol containers with different nozzle openings and from a pressurized system with a remote spray gun are shown on Tables 3 and 4. The bonding characteristics of Samples 1–12 are shown on Tables 5 and 6. Bonding characteristics of commercially available contact adhesives are shown on Table 7.

| | Grams | Pounds |
|---|---|---|
| Chloroprene/Methacrylic Acid Copolymer | 274,042 | 603.6 |
| Polychloroprene (BP223) | 58,234 | 128.3 |
| Polychloroprene (BP213) | 10,277 | 22.6 |
| Alkylphenolic Resin (HJR 1367) | 196,968 | 433.9 |
| Terpene Phenolic Resin (SP 553) | 42,819 | 94.3 |
| Magnesium Oxide | 37,681 | 83.0 |
| Antioxidant (WINGSTAY L) | 5138 | 11.3 |

-continued

| | Grams | Pounds |
|---|---|---|
| Hexane | 642,292 | 1414.7 |
| Acetone | 591,585 | 1303.1 |
| Toluene | 236,634 | 521.2 |
| Cyclohexane | 121,697 | 268.1 |
| Pentane | 98,034 | 215.9 |
| Water | 2,789 | 6.14 |

Chloroprene/Methacrylic Acid Copolymer used in this formulation is commercially available from E. I. du Pont de Nemours & Co. (Inc.), Wilmington Del. 19896, under the brand name NEOPRENE AF. Polychloroprene (BP223) and Polychloroprene (BP213) are commercially available from Mobay Corporation, a Bayer USA Inc. Company, Plastics and Rubber Division, Pittsburgh, Pa. 15205–9741, under the product names BP223 and BP213, respectively. Alkylphenolic Resin (HJR 1367) and Terpene Phenolic Resin (SP 553) are commercially available from Schenectady Chemicals, Inc., Box 1046, Schenectady, N.Y. 12301, under the product names HRJ 1367 and SP 553, respectively. Magnesium Oxide is commercially available fromPremier Services Corporatio, 7251 Engle Road, Suite 4125, Middleburg Heights, Ohio 44130, under the brand name MAGOX® Antioxidant (WINGSTAY L)is commercially available from Good Year Chemicals, Akron, Ohio 44316, under the brand name WINGSTAY® L.

TABLE 1

Viscosity Reduction by Increasing Pressure

| Samples # | Passes # | Pressure psi. | Viscosity sec. | Molecular Weight | Polydispersivity |
|---|---|---|---|---|---|
| 1 | 0 | NA | 21.0 | 340,000 | 2.5 |
| 2 | 1 | 5,000 | 18.0 | 310,000 | 1.9 |
| 3 | 1 | 10,000 | 17.6 | 265,000 | 1.8 |
| 4 | 1 | 15,000 | 17.4 | 245,000 | 2.0 |
| 10 | 1 | 20,000 | 17.0 | 255,000 | 2.0 |
| 11 | 1 | 25,000 | 17.3 | 230,000 | 1.8 |
| 12 | 1 | 28,000 | 16.6 | 220,000 | 1.7 |

TABLE 2

Viscosity Reduction With Multiple Passes

| Samples # | Passes # | Pressure psi. | Viscosity sec. | Molecular Weight | Polydispersivity |
|---|---|---|---|---|---|
| 4 | 1 | 15,000 | 17.4 | 245,000 | 2.0 |
| 5 | 2 | 15,000 | 16.5 | 230,000 | 1.5 |
| 6 | 3 | 15,000 | 15.8 | 190,000 | 1.6 |
| 7 | 4 | 15,000 | 15.6 | 175,000 | 1.5 |
| 8 | 5 | 15,000 | 15.7 | 170,000 | 1.4 |
| 9 | 6 | 15,000 | 15.4 | 155,000 | 1.4 |

Viscosity of Samples 1–12 was reduced by shearing polychloroprene contact adhesive in a Microfluidizer® Processor, model M-210, commercially available from Microfluidics International Corporation, 30 Ossipee Road, Newton Mass. 02164–9101. The amount of shear is proportional to the pressure applied during the operation of the Microfluidizer Processor. Additional shear can be imparted by passing the contact adhesive through the Microfluidizer Processor additional times.

Viscosity was determined with a Stormer Viscometer under Test Method C of American Society for Testing and Materials (ASTM) D 1084, Standard Test Methods for Viscosity of Adhesives. A 200 gram weight was used.

Molecular weight was determined by gel permeation chromatography for Samples 1–12. Results are the average of two runs. Samples were dried for evaporating solvents. Solids were dissolved in reagent grade toluene to give a 0.3 weight percent (wt %) solution. Solutions were filtered through a 0.45 micrometer (μm) filter. The gel permeation chromatography (GPC) system used for determining these molecular weights is commercially available from the Waters Corporation, 34 Maple Street, Milford, Mass., 01757. This GPC system includes a Waters 410 Differential Refractometer with shelf assembly and column heater module, (PN WAT023995), Waters 717 Plus Autosampler, (PN WAT078900), Waters 600 Multisolvent delivery system, (PN WAT062710), Waters Millenium® 2010 Workstation (PN WAT042862), including the GPC Chromatography Manager, (PN WAT038977), Waters HR Stratagel (5μm styrene-divinylbenzene particles) GPC columns, HR 5, (PN WAT044227), HR4, (PN WAT044224), HR3 (PN WAT044221), HR1 (PN WAT044233). Polystyrene standards ranging from 2,399,254 to 28,517 molecular weight were used for calibration. Conditions for the GPC are as follows:

Mobile Phase: Toluene at 1 milliliter per minute

Detector: Differential refractive index at 32X

Temperature: 70° C. oven, 50° C. detector

Columns: HR 5, 4, 3, and 1 Stratagel

Molecular weight reported in Tables 1 and 2 is the weighted average molecular weight. It is believed that large molecules contribute more to this molecular weight determination than small molecules.

Polydispersivity is determined from measurements made with this GPC system. It is believed that polydispersivity is a measure of the range of molecular weights and their concentration in a test sample.

Aerosol spray containers were filled with 234.3 grams of Samples 1–12 along with 191.7 grams of dimethyl ether as a propellant. The solids content of these aerosol containers was 15 percent by weight of the contents of the aerosol container.

Samples 1–12 were also sprayed from an air atomized spraying system that is commercially available from Binks Manufcturing Company, 9201 West Belmont Avenue, Franklin, Ill., 60131.

TABLE 3

Spray Characteristics of Contact Adhesive Sheared at Increasing Pressures

| Samples # | Viscosity Stormer sec. | Polydispersivity | Aerosol 1 | 2 | 3 | Atomized psi. |
|---|---|---|---|---|---|---|
| 1 | 21.0 | 2.5 | VB | VB | VB | 105 |
| 2 | 18.0 | 1.9 | G | VB | VB | 90 |
| 3 | 17.6 | 1.8 | G | VB | VB | 76 |
| 4 | 17.4 | 2.0 | G | VB | VB | 74 |
| 10 | 17.0 | 2.0 | VG | VB | VB | 72 |
| 11 | 17.3 | 1.8 | VG | VB | VB | 72 |
| 12 | 16.6 | 1.7 | E | VB | VB | 72 |

VB - No lace pattern
B - Lace pattern with height between ¼ and ½ inches
G - Lace pattern with height between ½ and 1 inches
VG - Lace pattern with height between 1 and 2 inches
E - Lace pattern with height between 2 and 4 inches

TABLE 4

Spray Characteristics of Contact Adhesive Sheared by Additional Passes at 15,000 psi

| Samples # | Viscosity sec. | Polydispersivity | Aerosol 1 | 2 | 3 | Atomized psi. |
|---|---|---|---|---|---|---|
| 4 | 17.4 | 2.0 | G | VB | VB | 74 |
| 5 | 16.5 | 1.5 | VG | VB | B | 72 |
| 6 | 15.8 | 1.6 | E | B | VG | 66 |
| 7 | 15.6 | 1.5 | E | VG | VG | 66 |
| 8 | 15.7 | 1.4 | E | VG | VG | 64 |
| 9 | 15.4 | 1.4 | E | E | E | 60 |

VB - No lace pattern
B - Lace pattern with height between ¼ and ½ inches
G - Lace pattern with height between ½ and 1 inches
VG - Lace pattern with height between 1 and 2 inches
E - Lace pattern with height between 2 and 4 inches

TABLE 5

Bonding Characteristics of Contact Adhesive Sheared at Increasing Pressures

| Samples # | Viscosity sec. | Polydispersivity | Plug psi | Deadload 48 hours °C. | 2 weeks °C. |
|---|---|---|---|---|---|
| 1 | 21.0 | 2.5 | 80 | 110 | 130+ |
| 2 | 18.0 | 1.9 | 75 | 100 | 130+ |
| 3 | 17.6 | 1.8 | 75 | 100 | 130+ |
| 4 | 17.4 | 2.0 | 80 | 100 | 130 |
| 10 | 17.0 | 2.0 | 95 | 100 | 130+ |
| 11 | 17.3 | 1.8 | 85 | 100 | 120 |
| 12 | 16.6 | 1.7 | 105 | 100 | 130+ |

TABLE 6

Bonding Characteristics of Contact Adhesive Sheared by Additional Passes at 15,000 psi

| Samples # | Viscosity sec. | Polydispersivity | Plug psi | Deadload 48 hours °C. | 2 weeks °C. |
|---|---|---|---|---|---|
| 4 | 17.4 | 2.0 | 80 | 100 | 130 |
| 5 | 16.5 | 1.5 | 95 | 100 | 120 |
| 6 | 15.8 | 1.6 | 105 | 90 | 115 |
| 7 | 15.6 | 1.5 | 100 | 90 | 110 |
| 8 | 15.7 | 1.4 | 100 | 90 | 110 |
| 9 | 15.4 | 1.4 | 100 | 90 | 110 |

Plug testing provides an indication bond strength between laminate and non-metallic substrates, such as particleboard, plywood or laminate. Laminate measuring 2.5 inches wide and 7.75 inches long is bonded to particleboard measuring 2.5 inches wide and 7.75 inches long with Samples 1–12. The test specimens are cured in an oven at 75° F. for 48 hours. After curing, the laminate is cut through to the particle board at three spaced apart locations along the test specimen with a 1.75 inch outside diameter hole saw. Using the pilot hole made in making the 1.75 inch cut, The particle board is cut through to the laminate with a 1 inch outside diameter hole saw. A 1 inch outside diameter washer with a bolt extending through the washer and pilot hole is placed against the particle board. A force is applied to the bolt extending through the pilot hole at 2 inches per minute. The force at which the laminate separates from the particleboard is recorded as the plug strength. Plug strengths of 50 psi or greater are considered as commercially acceptable. Plug strengths of 100 psi or greater are considered as excellent.

Deadload testing provides an indication of the load bearing capability of laminate bonded to non-metallic substrates, such as particleboard, plywood or laminate. Laminate measuring 2 inches wide and 3.5 inches long is bonded to particleboard measuring 2 inches wide and 2.5 inches long with Samples 1–12. This leaves laminate measuring 1 inch extending beyond the end of the particleboard at the top of the test specimen. The test specimens are cured in an oven at 75° F. for 48 hours and 2 weeks. After curing, the laminate is cut through to the particle board 1 inch from the bottom of the test specimen. This leaves laminate measuring 2 inches wide and 2 inches long bonded to particleboard measuring 2 inches wide and 2 inches long. The test specimen is hung in an oven by a hole drilled through the laminate extending beyond the particleboard at the top of the specimen. A 7.5 pound weight is hung from a hole drilled through the laminate and particle board below the cut made through the laminate 1 inch from the bottom of the test specimen. The temperature in the oven is increased from 50° to 130° C. in 10° C. increments every 15 minutes. The temperature at which the laminate releases from the particleboard is recorded as the deadload temperature.

Samples 1–12 passed corner and edge lift and peel tests.

Contact adhesive formulated with the substitution of Alkylphenolic Resin, commercially available under the product name FRJ-551, from Schenectady Chemicals, Inc., for Alkylphenolic Resin (HRJ-1367) in Samples 1–12, did not retain its deadload strength after shearing. In a deadload test, laminate separated from substrate at 70° C., 30°–60° C. below the temperature that samples 1–12 separated. Alkylphenolic Resin (HRJ-1367) is known commercially to have a higher heat resistance than Alkylphenolic Resin (FRJ-551).

TABLE 7

Bonding Characteristics of Commercially Available Contact Adhesive

| Samples # | Elastomer | Plug psi | Deadload 48 hours °C. | 2 weeks °C. |
|---|---|---|---|---|
| C-1 | Polychloroprene | 80 | 100 | 130 |
| C-2 | Styrene Butadiene Rubber | 50 | 70 | 70 |
| C-3 | Styrene Butadiene Rubber | 110 | 90 | 90 |
| C-4 | Styrene Butadiene Rubber | 75 | 70 | 70 |
| C-5 | Styrene Isoprene Styrene | 125 | 50 | 50 |
| C-6 | Styrene Isoprene Styrene | 95 | 90 | 80 |
| C-7 | Styrene Isoprene Styrene | 65 | 90 | 90 |

Sample 12 was charged into an aerosol container with dimethyl ether as a propellant. The solids content in the container was 15 percent by weight of the contents of the container. The entire contents of aerosol containers were sprayed and spray patterns were made on paper when the can was full, at 100 percent by volume of capacity, and at 50 and 10 percent of capacity. A sample of the spray pattern was dried and cut into four equal sections, each comprising one-fourth of the pattern transverse to the direction of the sprayhead motion. Following is the amount of polychloroprene contact adhesive on each section expressed as the percentage of the total polychloroprene adhesive on the sample. The spray pattern of Sample 12 is compared with Sample C-1. U.S. Pat. No. 4,401,272 is disclosed on the label of Sample C-1. The height of the spray pattern on Sample 12 remained about the same as the contents of the aerosol container was sprayed. The height of the spray pattern of Sample C-12 diminished.

Sample 12

| Capacity Percent by Vol. | Height Inches | Adhesive on One-Fourth of Spray Pattern Width (% of Total) Away from Container --- Toward Container | | | |
|---|---|---|---|---|---|
| 100 | 2³⁄₁₆ | 24.3 | 25.7 | 25.0 | 25.0 |
| 50 | 2⁵⁄₁₆ | 25.2 | 24.4 | 25.2 | 25.2 |
| 10 | 2⁵⁄₁₆ | 24.5 | 25.2 | 24.5 | 25.8 |

Sample C-1

| Capacity Percent by Vol. | Height Inches | Adhesive on One-Fourth of Spray Pattern Width (% of Total) Away from Container --- Toward Container | | | |
|---|---|---|---|---|---|
| 100 | 1⅛ | 25.8 | 24.2 | 25.0 | 25.0 |
| 50 | 1⁹⁄₁₆ | 22.0 | 25.0 | 28.0 | 25.0 |
| 10 | 1⅛ | 23.0 | 24.0 | 27.0 | 26.0 |

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty that reside in the present invention, including all features that would be treated as equivalents thereof by those skilled in the art to which this invention pertains.

We claim:

1. A method of making a contact adhesive, comprising:
   mixing chloroprene/methacrylic acid copolymer, polychloroprene, magnesium oxide, tackifier, antioxidant, organic solvent, and water for making a contact adhesive, and
   shearing the contact adhesive in a microfluidizer for reducing its ASTM D 1084 Saybolt viscosity by 10 percent or more, while maintaining the solids concentration constant at a level of not less than 15 weight percent.

2. The method of claim 1 wherein the contact adhesive is sheared for reducing its ASTM D 1084 Saybolt viscosity by 15 percent or more.

3. The method of claim 1 wherein the contact adhesive is sheared for reducing its ASTM D 1084 Saybolt viscosity by 20 percent or more.

4. A method of making a contact adhesive, comprising;
   mixing chloroprene/methacrylic acid copolymer, polychloroprene, alkylphenolic resin, terpene phenolic resin, magnesium oxide, antioxidant, hexane, acetone, toluene, cyclohexane, pentane, and water for making a contact adhesive, and
   shearing the contact adhesive in a microfluidizer for reducing its ASTM D 1084 Saybolt viscosity by 10 percent or more, while maintaining the solids concentration constant at a level of not less than 15 weight percent.

5. The method of claim 4 wherein the contact adhesive is sheared for reducing its ASTM D 1084 Saybolt viscosity by 15 percent or more.

6. The method of claim 4 wherein the contact adhesive is sheared for reducing its ASTM D 1084 Saybolt viscosity by 20 percent or more.

* * * * *